United States Patent Office 3,224,276
Patented Dec. 21, 1965

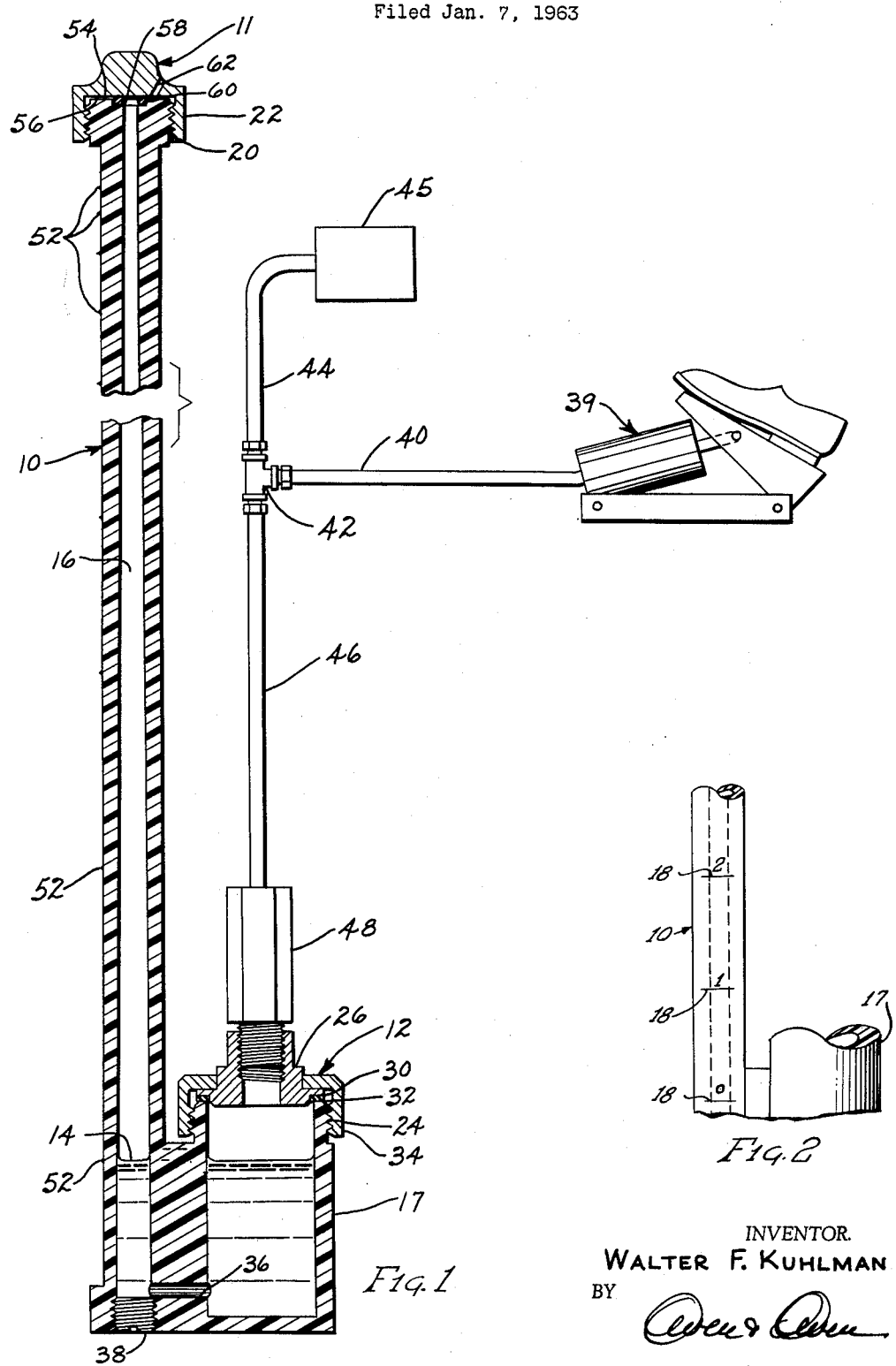

3,224,276
PRESSURE TESTING APPARATUS
Walter F. Kuhlman, Norwalk, Ohio, assignor to Kuhlman Instrument Company, Norwalk, Ohio, a corporation of Ohio
Filed Jan. 7, 1963, Ser. No. 249,717
6 Claims. (Cl. 73—401)

The present invention relates to a pressure testing apparatus and more particularly to a manometer which senses small pressure changes.

An object of the present invention is the provision of a new and improved manometer which can be used to measure small pressure changes both in a high pressure range and a low pressure range.

Another object of the invention is the provision of a new and improved manometer apparatus which can be used to detect small leaks both from high pressure equipment and from low pressure equipment, with but a minor adjustment of the apparatus.

A more particular object of the invention is the provision of a new and improved manometer apparatus having an improved valving arrangement at its upper end which enables the manometer to be manufactured with substantially identical valved-off internal volumes, and so that a standard set of pressure indicia can be applied to each manometer manufactured.

The invention resides in certain constructions and combinations and arrangements of parts, and further objects and advantages of the present invention will become apparent to those skilled in the art to which it relates from the following description of the preferred embodiment described with reference to the accompanying drawing forming a part of this specification, and in which:

FIGURE 1 of the drawing is a sectional view of a manometer embodying principles of the present invention; and FIGURE 2 is a fragmentary side view of a portion of the manometer shown in FIGURE 1.

Referring more specifically to the drawing, a manometer provided according to the present invention has a vertical stand pipe 10 of precise volume and carries, at its upper end, an improved valve which is indicated generally at 11. The manometer is intended to be used by conducting an unknown pressure to its pressure connection 12 with the valve 11 closed. The stand pipe 10 has a predetermined volume between a normal liquid line 14 and the valve 11. According to Boyle's law, the volume of a gas is decreased in half when the pressure on the gas is doubled. In accordance with this law, the volume of air space above the liquid line is decreased in half each time the pressure is doubled. If the rise in the liquid level is quite small, the valve 11 can be opened so that the reading will be in effect magnified, inasmuch as pressure will no longer be held upon the liquid in the stand pipe 10 of the manometer. Because high pressures can be read with the valve 11 closed, the manometer is preferably filled with a low specific gravity fluid such as water. A low specific gravity liquid gives larger changes in liquid level for a given pressure change than does a higher specific gravity liquid, and so the instrument is more sensitive when filled with a low specific gravity fluid. As a further aid in reading the higher pressures, the internal chamber 16 of the stand pipe 10 is preferably tapered so that its upper end is of a smaller cross section than is its lower end. The taper of the bore increases the liquid level change that occurs with pressure change at high levels of pressure. The tapering of the internal chamber 16 only becomes important when the manometer is used with the valve 11 closed, and does not affect the manometer when used with the valve 11 open.

According to further aspects of the present invention, the manometer is made very rugged and inexpensively by casting a reservoir 17 and the stand pipe 10 as one integral transparent plastic part, so that the liquid used in the manometer is readily visible and any plugging of the passages of the manometer can be easily detected. The operator can glance at his manometer, and be very quickly assured that the reading which he has obtained is exact. Because the manometer is intended to be filled with water, and because the manometer is intended to be transported around from test location to test location, it is expected that the water used in the manometer will be drained out and be replaced quite often.

In order to aid the operator in filling the manometer with water to the correct level, a suitable scribed line (not shown) is provided on the outside of the reservoir 17 exactly in line with the zero mark of the indicia 18 that is associated with the stand pipe 10. Because the manometer is made of a transparent plastic, the operator merely adds water to the reservoir 17 until the meniscus is exactly in line with the scribed line that is provided on the reservoir 17 opposite the zero mark of the indicia associated with the stand pipe 10, but should also verify that the meniscus in the stand pipe 10 is at zero.

In order that the manometer can stand several hundred pounds pressure, the reservoir 17 is given a cylindrical shape and its sidewalls as well as the sidewalls of the stand pipe 10 are made quite thick. In addition, the diameter of the reservoir 17 is a compromise between a large diameter section and a tall slender one. A tall slender configuration, of course, would withstand a greater pressure than would a large diameter reservoir of the same sidewall thickness, but on the other hand a tall slender reservoir allows a slight drop in the liquid level of the reservoir as fluid proceeds up the internal chamber 16 of the stand pipe 10. The indicia associated with the stand pipe, therefore, must be arranged to take into account the drop of liquid level in the reservoir 17 to assure correct pressure reading.

The indicia must also be arranged to take into consideration that the drop in liquid level in the reservoir 17 decreases as the liquid level rises in the stand pipe 10 because the cross sectional area of the stand pipe decreases at the higher pressure readings. In addition, either a correction must be applied to the pressure readings that are taken at various altitudes above sea level with the valve 22 closed, or special high pressure indicia must be provided for high pressure determinations at various altitudes above sea level.

Suitable threads 20 are cast upon the upper end of the stand pipe 10 for receiving the valve body 22. Threads 24 are also cast on the upper end of the reservoir 17 to receive the pressure connection 12. The pressure connection 12 generally comprises a cover 26 having a flange 28 on its lower end and which is sized to fit over the top of the reservoir 17. The lower surface of the flange 28 has a suitable groove 30 adjacent its area of overlap with the top of the reservoir 17 to receive a suitable gasket 32. The cover 26 is held in place by a suitable threaded collar 34 which is received on the threads 24 that are cast directly on the upper end of the reservoir 17. The manometer, of course, further includes a small internal opening 36 that is integrally cast therein to connect the bottom of the reservoir 17 with the bottom of the internal chamber 16 in the stand pipe 10. The lower end of the internal chamber 16 is also closed off by means of a threaded plug 38. Because the internal chamber 16 is tapered, and because the manometer is cast, the bottom of the internal opening 16 must extend externally of the casting so that the core which is used to make the internal chamber 16 can be withdrawn from the inside of the stand pipe 10. The opening through which the core is removed, of course, is closed by the threaded plug 38.

The valve body 22, the threaded collar 34, and the cover 26 are preferably made of plastic which may be the same as that from which the manometer body is made.

Because the manometer is intended to be used as a test instrument for leaks, the manometer equipment will include or further be associated with a suitable air pumping device indicated generally at 39 that is connected by means of a flexible hose 40 to a T connection 42. One branch of the T connection 42 includes a short section of hose 44 having a threaded union indicated generally at 45 on the end thereof for connecting to a suitable threaded fitting (not shown) that is either a part of the equipment being tested, or that is suitably installed on the equipment for the purposes of making the pressure or leak test. The other side of the T connection 42 is connected by means of a flexible hose 46 to a threaded fitting 48 that screws into the top of the cover 26 which closes off the top of the reservoir 17.

When it is desired to make a presssure test, the valve 11 is closed and the threaded union 45 is suitably connected to the system to be tested. The pump 39 is preferably a foot treadle operated device which the operator reciprocates with his foot to pump pressure in the device or system being tested. If it is desired to test at high pressure, the pumping is continued until a hundred or two hundred pounds pressure is developed. In a preferred embodiment the manometer is provided with a uniform set of indicia (not shown) and a non-uniform set of indicia 52 which can be made to read in any suitable units, such as pounds per square inch. The non-uniform indicia 52 will, of course, be used to read to pressure directly when the valve 11 is closed and will accordingly be based upon Boyle's law—a given volume of fluid is reduced in half each time that the pressure thereon is doubled. When a predetermined pressure is developed in the equipment, the manometer is read, and after a suitable time lapse the pressure is again read to determine the leakage which has occurred. If leakage at a low pressure is to be determined, the valve 11 is opened and a similar operation is performed.

Now that the general construction and operation of the manometer have been described, it will be apparent that the indicia 52 could not be predetermined and applied to each manometer during its molding operation if the valve 11 were of such a type that the internal volume varied from one valve to another, or if the valve were connected to the manometer in such a way that the volume would vary from one installation to the next. The assembly shown overcomes all of these difficulties by making the top end 54 of the tube 10 flat, to receive a flat surface 56 of the valve member which closes off the end of the chamber 16. The top surface 54 of the manometer 10 has a small groove 58 in which an O-ring 60 is seated. The O-ring 60 is compressed slightly by the flat surface 56 of the valve 11 when the latter is tightened down upon the surface 54 of the manometer.

In order to assure that all pressure is removed from the top of the chamber 16 when the valve is loosened, a drilling 62 is provided for communication with the atmosphere from the top of the chamber 16 between the threads 20 and the O-ring 60.

It will be apparent that the objects heretofore enumerated as well as others have been accomplished, and that there has been provided a manometer which is capable of reading both high and low pressures, which is simple and inexpensive to manufacture, and which is made of a single integral piece of transparent plastic on which indicia can be molded or otherwise affixed during the manufacture of the manometer. In addition to being useful in the measuring of pressure, the manometer is admirably suited for classroom instruction inasmuch as it is entirely made of plastic and all of its passages can be readily observed.

While the invention has been described in considerable detail, it is not to be limited to the particular embodiment shown and described, and it is intended to cover hereby all adaptations, modifications, and arrangements thereof which come within the practice of those skilled in the art to which the invention relates.

I claim:

1. In a device of the class described: means forming a measuring fluid reservoir, a transparent plastic tube extending upwardly from said reservoir, said tube having an internal opening which communicates with said reservoir, and at least the upper end of which gradually decreases in cross section as the distance increases from said reservoir, said tube having a flat upper end with a recess surrounding the upper end of said internal opening, an O-ring in said recess surronding said internal opening, said O-ring extending above said flat upper end when said O-ring is in its normal uncompressed condition, a valve for compressing said O-ring and abutting the upper end of said tube, indicia associated with said plastic tube for readily determining differences in liquid level between that in said tube and that in said reservoir, a conduit for placing said reservoir under pressure, and means for connecting said conduit to a pressure system to be tested, whereby a range of high pressures can be accurately measured with said valve closed and a range of lower pressures can be measured with said valve open.

2. A device of the class described comprising: an integral transparent plastic structure having a first tubular portion defining an internal chamber which decreases in cross sectional area along the vertical length of said tube, said plastic structure having a portion forming a second integral reservoir defining an internal chamber which has a cross sectional area larger than that of said tube and extending vertically parallel to said tube for containing an indicating fluid, said internal chambers being in communication adjacent their lower ends, threaded connections at the upper ends of said tube and reservoir, a cap threaded onto said reservoir, said cap having means providing communication between said reservoir and a source of pressure, indicia associated with said first tubular portion for ascertaining the level of indicating fluid in said first tubular portion above the liquid level in said integral reservoir, and a valve threadably connected to the upper end of said tube.

3. A device of the class described comprising: a molded axially extending transparent plastic tube having an axially extending opening therein, said tube having an upper end and a lower end, a reservoir having a normal liquid level, means enabling fluid communication between said reservoir and the lower end of the opening in said tube to establish a normal liquid level in said tube, means for applying pressure to fluid in said reservoir to force liquid upwardly into the opening in said tube, said transparent plastic tube having an upper generally flat end surface to which said axially extending opening extends, said upper end surface having a recess therein surrounding the opening, an annular O-ring of resilient gasket material in said recess and extending above said upper end surface, and a threaded valve member threadably attached to the upper end of said plastic tube for movement into and out of engagement with said gasket material and said upper end surface of said tube to effect and break a seal therewith, and indicia applied to said tube to indicate pressure applied to said reservoir.

4. A device of the class described comprising: an integral transparent plastic structure having a first tubular portion defining an internal chamber extending along the vertical length of said tube, said plastic structure having a portion forming a second integral reservoir defining an internal chamber which has a cross-sectional area larger than that of said tube and extending generally parallel to said internal chamber of said tube for containing an indicating fluid, said internal chambers being in communication adjacent the lower ends thereof, threaded connections at the upper ends of said tube and reservoir, a cap threaded onto said reservoir, said cap having means for providing communication between said reservoir and a source of pressure, indicia associated with said first tubular portion for ascertaining a level of indicating fluid in said first tubular portion above the liquid level in said integral reservoir, and a valve threadably connected to the upper end of said tube.

5. A device of the class described comprising: an integral transparent plastic structure having a first tubular portion defining an internal chamber adapted normally to be supported vertically and which extends along the vertical length of said tube, said internal chamber opening outwardly of the top and bottom ends of said tubular portion, said plastic structure having a portion forming a second integral reservoir defining an internal chamber which has a cross-sectional area larger than that of said tube and extending vertically parallel to said tube for containing an indicating fluid, said structure having a passageway providing communication between the lower ends of said internal chamber and said reservoir, a plug closing the lower end of said internal chamber of said tubular portion beneath said passageway, threaded connections at the upper ends of said tubular portion and said reservoir, a cap threaded onto the upper end of said reservoir, said cap having means for providing communication between said reservoir and a source of pressure, indicia associated with said first tubular portion for ascertaining the level of indicating fluid in said first tubular portion above the liquid level in said integral reservoir, and a valve threadably connected to the upper end of said tubular portion.

6. A device of the class described comprising: an integral transparent plastic structure having a first tubular portion defining an internal chamber adapted normally to be supported vertically and which decreases in cross-sectional area along the vertical length of said tube, said internal chamber opening outwardly of the top and bottom ends of said tubular portion, said plastic structure having a portion forming a second integral reservoir defining an internal chamber which has a cross-sectional area larger than that of said tube and extending vertically parallel to said tube for containing an indicating fluid, said structure having a passageway providing communication between the lower ends of said internal chamber and said reservoir, a plug closing off the bottom end of said internal chamber of said tubular portion beneath said passageway, said tubular portion having a flat upper end with a recess therein surrounding said internal chamber, an annular O-ring of resilient gasket material in said recess, said O-ring extending above said flat upper end when said O-ring is in its normal uncompressed condition, a valve for compressing said O-ring and abutting the upper end of said tube, a cap threaded onto said reservoir, said cap having means for providing communication between said reservoir and a source of pressure, indicia associated with said first tubular portion for ascertaining the level of indicating fluid in said first tubular portion above the liquid level in said integral reservoir, and whereby a range of high pressures can be accurately measured when said valve is in sealing engagement with said O-ring and a range of low pressures can be measured when said valve is out of engagement with said O-ring.

References Cited by the Examiner

UNITED STATES PATENTS

| 20,848 | 7/1858 | Grimes | 73—401 |
| 718,167 | 1/1903 | Spencer et al. | 73—401 |
| 1,245,559 | 11/1917 | Booth | 73—401 |

OTHER REFERENCES

Stuart: "An Improved Manometer Built of Plastics," Instruments, vol. 15, December 1942 (page 524 relied on).

RICHARD C. QUEISSER, *Primary Examiner.*

JOSEPH P. STRIZAK, *Examiner.*